Nov. 17, 1970 T. J. HARRIS 3,540,795

ACHROMATIC COMPENSATION APPARATUS USING POLARIZATION ROTATION AND BIREFRINGENT ELEMENTS

Filed Jan. 15, 1969 4 Sheets-Sheet 1

INVENTOR
THOMAS J. HARRIS

BY John F. Ostendorf

ATTORNEY

United States Patent Office
3,540,795
Patented Nov. 17, 1970

3,540,795
ACHROMATIC COMPENSATION APPARATUS USING POLARIZATION ROTATION AND BIREFRINGENT ELEMENTS

Thomas J. Harris, Chestnut Hill, Mass., assignor to International Business Machines Corporation, Armonk, N.Y., a corporation of New York Filed Jan. 15, 1969, Ser. No. 791,257
Int. Cl. G02f *3/00*
U.S. Cl. 350—157 9 Claims

ABSTRACT OF THE DISCLOSURE

Longitudinal chromatic aberration and transverse chromatic aberration occurring in light deflection apparatus and other optical systems, such as chromatic displays and printers, are compensated. Compensation is simultaneously provided for a plurality of colors or wavelengths of light so that the colors and the position fields may be superimposed on an output medium. Object and image distances are both compensated by utilizing conventional lenses, polarization rotation and birefringent elements. The colors are rotated by different amounts and follow different axes and thus different optical paths through the birefringent elements.

BACKGROUND OF THE INVENTION

Field of the invention

This invention relates to aberration compensating apparatus for use with chromatic optical systems and in particular light deflection systems operating on a plurality of wavelengths of light. More particularly, this invention pertains to longitudinal chromatic aberration and transverse aberration compensating apparatus which acts simultaneously on the object images positioned by a device such as a light deflector so that the position fields of the various wavelengths are superimposed on an output medium.

DESCRIPTION OF THE PRIOR ART

To give an example of how the apparatus of this invention can be used, consider the display and printer systems of the type described in U.S. Pat. No. Re. 26,170. In the patent, light deflection systems are employed for positioning characters at a desired location on an output medium. The light deflectors may be of the type described in copending application Ser. No. 285,832 filed June 5, 1963 in the names of Harris et al. and assigned to the assignee of this invention.

In the light deflection systems employed in the cited patent, three kinds of aberration occur when the system is operated with different colors of light. The types of aberration are longitudinal chromatic aberration, transverse chromatic aberration and half-wave voltage aberration. The longitudinal chromatic aberration and transverse chromatic abberation are caused by the increase of the ordinary and extraordinary indices of refraction by the light deflector acting on shorter wavelengths of light. In display and printing applications images must have the same size and be imaged on the same display screen regardless of the color of the image. The apparatus of this invention is concerned with the compensation of longitudinal and transverse aberrations.

In the past, attempts at compensating for the longitudinal aberration at the input of the deflector have included combining glass lenses. However, this has been unsuccessful since the anomalous differences in indices of refraction must be in the order of 0.02 and no regular glass lenses are capable of acting for such a large value. Other attempts at compensation have included adding anomalous dispersive crystals to the birefringent elements of the deflector. These efforts have been unsuccessful because of the difficulty of obtaining such crystals and because such an approach increases the length of the light deflector and reduces the optical resolution of the system.

Pending application Ser. No. 678,444 filed Oct. 26, 1967 in the names of Fleisher et al. and assigned to the same assignee as this invention describes a compensation arrangement for longitudinal and transverse chromatic aberration. This apparatus is capable of operating on a plurality of colors or wavelengths of light. However, the compensation can only be performed on one wavelength at any particular time. The apparatus of that application requires the utilization of a specific birefringent lens and an adjustable polarization rotator such as an electro-optic crystal.

SUMMARY OF THE INVENTION

As contrasted with the prior art methods of aberration compensation, the apparatus of this invention acts on two or more colors or wavelengths of light simultaneously. It employs only passive elements and does not require the use of any special type components. The apparatus comprises an object distance compensator positioned between the object planes at the output of the deflector and a conventional lens. The apparatus also comprises an image distance compensator positioned between the lens and the output medium. The lens acts to image the object planes on the medium to yield superimposed images.

Each compensator comprises a plurality of stages equivalent in number to one less than the number of wavelengths of light acted on. Each compensator, except for the first stage of the image distance compensator, is formed of a passive polarization rotator and a birefringent device. The first stage of the image distance compensator employs only a birefringent device. The polarization rotators selectively act, dependent on their length, to rotate selected ones of the wavelengths of light such that the birefringent devices present different paths of travel for the rotated and unrotated wavelengths. The cumulative output of the plural stages in the object distance compensator in conjunction with the plural stages of the image distance compensator act to give equal magnification to these objects.

DESCRIPTION OF THE PREFERRED EMBODIMENT

Figures 1, 2, 3:
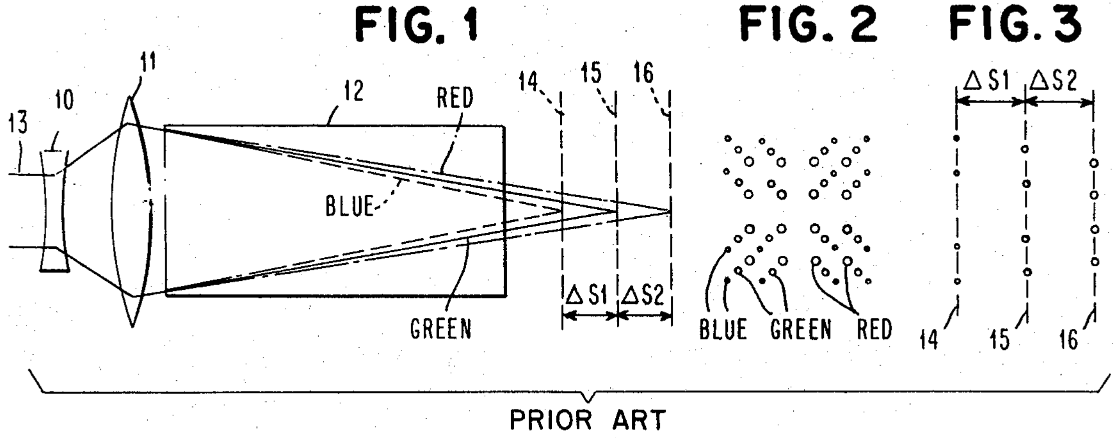
FIG. 1 is a schematic diagram which illustrates longitudinal (axial) chromatic aberration (dispersion) of a prior art uncompensated illustrative system utilizing a light deflector.
FIG. 2 illustrates the front view of the deflector output of FIG. 1 and shows the transverse (lateral) chromatic aberration (dispersion) of an image transmitted through the deflecting apparatus.
FIG. 3 illustrates the side view of the deflector output and shows both the longitudinal and transverse aberration of the deflection apparatus of FIG. 1.

The prior art system of FIG. 1 illustrates the longitudinal dispersion which occurs in a noncompensated display or printer system in which a light deflector is employed to position characters.

The system includes a dispersion compensated negative lens 10, a dispersion compensated positive lens 11 and a pathlength compensated digital light deflector 12. The compensated lenses 10, 11 may actually be formed of several lens components. The deflector 12 is of the type described in the above cited application Ser. No. 285,832. However, a light deflection system that is pathlength compensated is described in U.S. Pat. No. 3,391,972.

Deflector 12 comprises a plurality of stages. Each stage is formed of an electro-optic polarization rotator for rotating a light beam into one of two mutually orthogonal planes and birefringent means for transmitting the beam along one of two paths dependent on the plane of its polarization. Each birefringent means includes two elements having particular orientations such that the optical pathlengths of the beams in the two planes are substantially equal through each stage.

Light beam 13 is incident upon lens 10 and is linearly polarized. By applying a voltage to a rotator of each stage of deflector 12 the polarization is rotated to one of two directions so that the light beam follows one of two possible paths through the birefringent means of that stage. All of the stages are controlled in a similar manner such that input beam 13 is positioned in both $x$ and $y$ directions at the output of deflector 12 under the control of the voltages applied to the rotators.

Since deflector 12 is pathlength compensated, if only one color or wavelength of light is employed all light beams have a common focal plane regardless of the amount of deflection. However, since the index of refraction of a transparent material varies with the wavelength of the light, longitudinal dispersion and transverse dispersion occur when the system is employed with two or more different colors of light such as the blue, green and red lights utilized in FIG. 1.

This dispersion must be eliminated when using a focused light since the combination of lens 11 and deflector 12 have different focal lengths for different colors. For example, the blue spot image is formed in an image plane 14, the green spot image in image plane 15 and the red spot image in image plane 16. The distance between planes 14 and 15 is indicated as $\Delta S1$ and the distance between planes 15 and 16 as $\Delta S2$. Because of the different image planes, the blue, green and red images are not coincident on a fixed output medium which may take the form of a display screen or a photosensitive medium in a printing application. The combined positioning of lens 11 and deflector 12 causes the red image to be smaller than the green and blue images, and the green image to be smaller than the blue image because the deflection accomplished by the birefringent means in deflector 12 is dependent on the wavelength of light.

The transverse position dispersion for an image consisting of an array of points is shown in FIG. 2 for the image formed looking toward the output end of deflector 12. FIG. 3 illustrates both the longitudinal dispersion and transverse dispersion as seen from the output side of deflector 12 in FIG. 1.

This dispersion cannot be directly compensated by adding anomalous dispersive crystals to the birefringent means of deflector 12 since such crystals are difficult to obtain. In addition this approach increases the length of deflector 12 and ultimately reduces the optical resolution of the system. Furthermore, lens 11 cannot provide the necessary compensation since the anomalous differences in the indices of such an anomalous dispersive lens would have to be of the order of 0.02 at the input side of deflector 12. As a practical matter, no combination of regular glass lenses could account for such a great value. The requirements for a glass lens at the output of deflector 12 are even more strained since such a lens would have to be compensated for the same order of magnitude of normal dispersion as provided at the input side of deflector 12, and in addition compensate for the resultant transverse dispersion.

Figure 4:
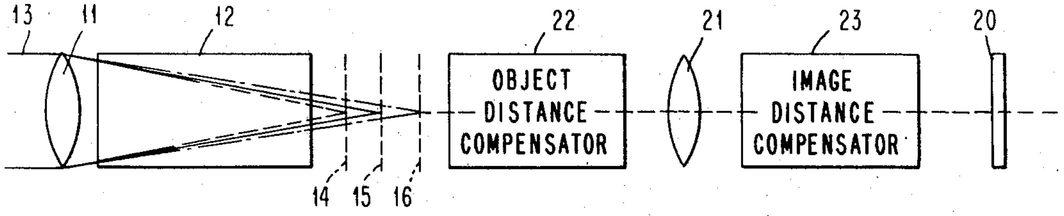
FIG. 4 is a schematic diagram of a compensated system acting on the images transmitted through a deflecting system.

Referring now to FIG. 4, the compensating apparatus provided for imaging the object images at planes 14, 15 and 16 on output medium 20 include a conventional lens 21. Lens 21 is positioned between output medium 20 and the output planes 14, 15 and 16 of deflector 12 for each wavelength. The compensating apparatus includes an object distance compensator positioned between the output planes 14, 15 and 16 and lens 21, and an image distance compensator 23 positioned between lens 21 and output medium 20.

Figure 5:
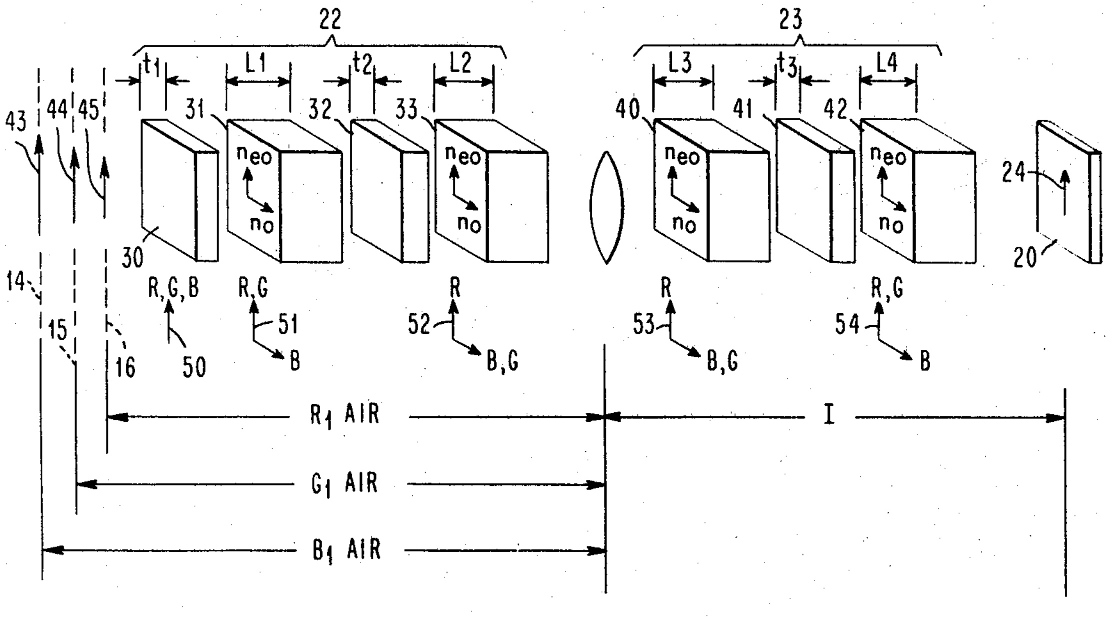
FIG. 5 is a schematic diagram of the compensating apparatus employed in the system of FIG. 4.

As shown in FIG. 5 object distance compensator 22 is formed of a plurality of stages equal in number to one less than the number of wavelengths being compensated. The object distance compensator includes passive dispersive polarization rotators 30, 32 and birefringent crystals 31, 33.

The rotators may be quartz crystals having predetermined lengths $t1$, $t2$ respectively. The operation of such quartz crystals is well known in the art in acting selectively to rotate particular wavelengths of incident light. The total rotation imparted to a given wavelength is dependent on the length of the quartz crystal. A complete description of the operation of such quartz crystals is provided in copending application Ser. No. 609,166 filed Jan. 13, 1967 in the name of Thomas J. Harris and assigned to the same assignee as this invention, now U.S. Pat. No. 3,501,640.

The birefringent device of each stage may be a calcite crystal of predetermined length. Thus crystals 31 and 33 are indicated as having lengths L1 and L2, respectively. Crystals 31 and 33 are oriented with their optic axes in planes normal to the axis of the system so that two independent indices of refraction $n_o$ and $n_{eo}$ are presented to the incident light.

Similarly, the image distance compensator 23 is formed of stages equivalent in number to the number of stages in the object distance compensator 22. Each stage except the first includes a polarization rotator 41 and a birefringent crystal 42. The first stage of compensator 23 only requires a birefringent device 40. The polarization rotator 41 has a length $t3$ and the birefringent elements 40, 42 have lengths L3, L4, respectively.

In FIG. 5 the object images 43, 44, 45 provided at the output of deflector 12 in the planes 14, 15, 16, respectively, have different sizes. Thus, the longer wavelength for the red image 45 is smaller than the images 43, 44 for the blue and green wavelengths. Other combinations of object sizes and positions can be similarly compensated by the configuration to be described by using the proper lengths of birefringent crystals and rotating the planes of polarization of the different colors in the right sequence and having them propagate with the proper index of refraction $n_o$ or $n_{eo}$.

The apparatus acts not only to position the object images at 24 on output medium 20 but to position them with the same size. As will be apparent from the discussion which follows hereinafter, the relationship among the distances $R_1$, $G_1$ and $B_1$ determines the magnification of the objects 43, 44, 45 on medium 20.

The objects 43, 44, 45 all have the same polarization direction as indicated at 50. Crystal 30 is selected to have a length $t1$ such that it acts on the polarization stages of the blue, green and red light causing the polarization of the blue light to be rotated to an orthogonal state relative to the red and green polarization as indicated at 51. Birefringent device 31 presents its ordinary and extraordinary axes such that the blue light follows the ordinary axis and the red and green light follow the extraordinary axis. The effect is to provide the three wavelengths of light at crystal 32 with the red and green lights having traversed a greater optical path distance than the blue light. Polarization rotation crystal 32 is selected to have a length $t2$ which rotates the polarization state of the red light to an orthogonal polarization state relative to the green and blue polarization states as indicated at 52. Thus, on entering birefringent device 33 the blue and green components of the light have the same polarization and the red component is orthogonally displaced from them. The red component follows the extraordinary axis through crystal 33 and the blue and green components traverse the ordinary axis.

The images are provided with the polarization directions to birefringent device 40 as indicated at 53. The red image follows the path of the extraordinary index of refraction and the blue and green images the path of the ordinary index of refraction. The optical path distance traversed by the blue and green images is lengthened with respect to that followed by the red image. Polarization rotation crystal 41 having a length $t3$ rotates the polarization directions such that the green is orthogonally displaced from its previous orientation and from that of the blue light as shown at 54. Birefringent device 42 presents the extraordinary index of refraction to the red and green light and the ordinary index of refraction to the blue light. By suitably selecting the length of the polarization rotation elements and the birefringent devices, the three components of the light are imaged in the same focal plane as the image 24 on output medium 20.

Figure 6:
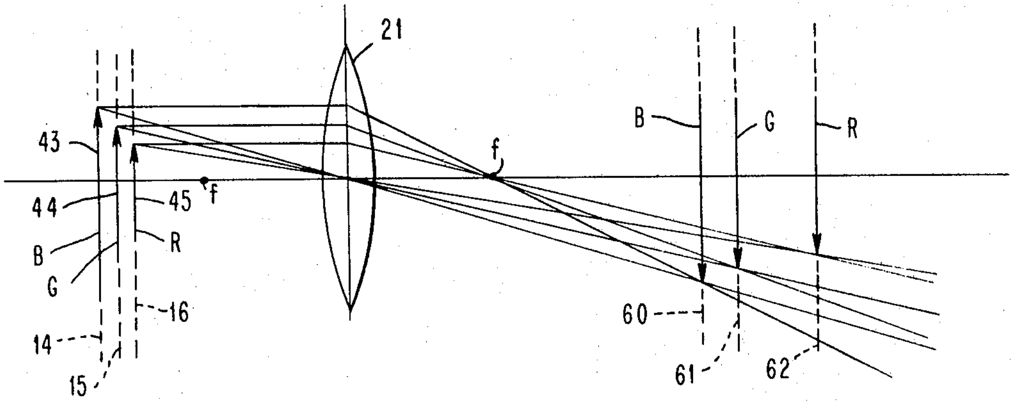
FIG. 6 is a schematic diagram showing the operation of the lens alone.

Reference may be made to FIG. 6 for an understanding of the operation of lens 21 alone having a focal length $f$. Three different objects 43, 44, 45 each positioned in a different plane 14, 15, 16 and having different sizes cannot be superimposed by lens 21 acting alone. Lens 21 positions the objects in planes 60, 61, 62 with the same relative sizes as the objects 43, 44, 45.

Figure 7:
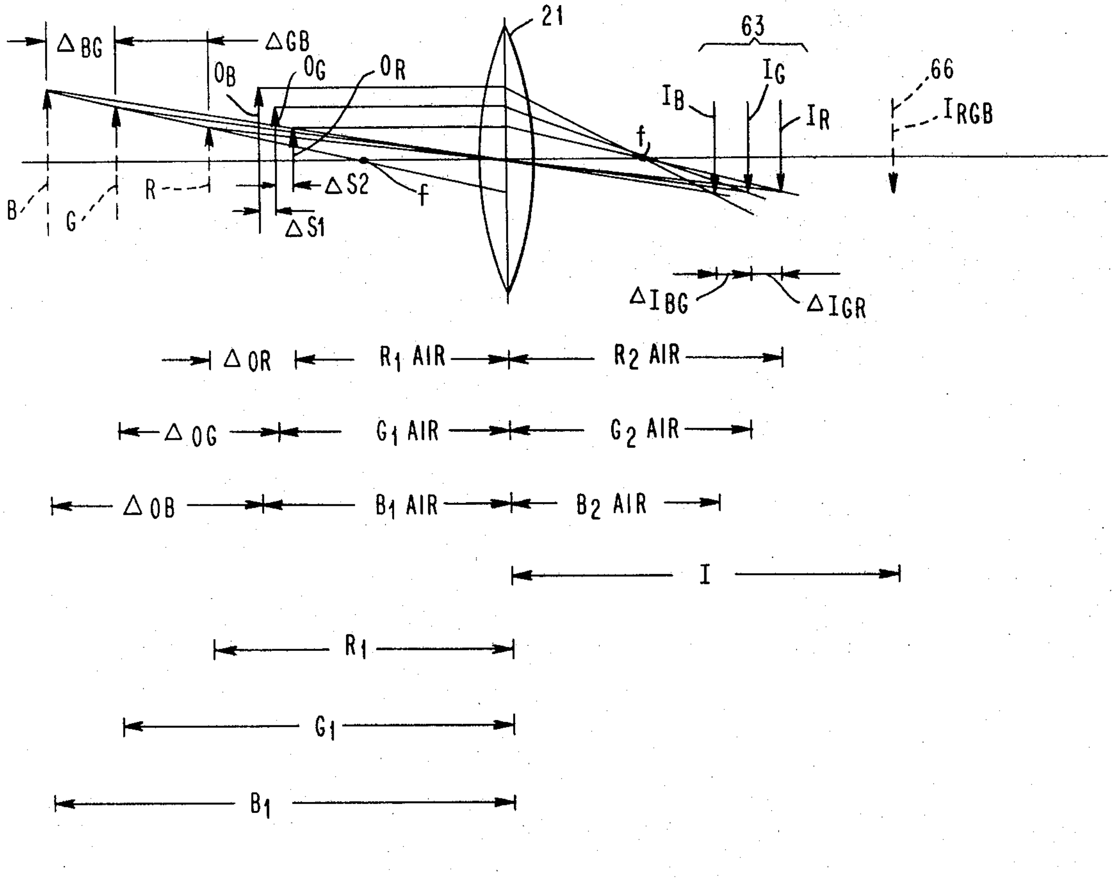
FIG. 7 is a schematic diagram showing how the object and image planes are selectively shifted.

If planes 14, 15, 16 are selectively shifted distances $\Delta_{OR}$, $\Delta_{OG}$, and $\Delta_{OB}$, as shown in FIG. 7, then objects 43, 44, 45 are imaged by lens 21 such that the images $I_R$, $I_G$ and $I_B$ are the same size as indicated at 63. Thus, shifting of planes 14, 15, 16 corrects for the transverse aberrations due to deflector 12, as shown in FIG. 2. Selective shifting of planes 14, 15, 16 is accomplished by object distance compensator 22 as shown in FIG. 4.

Figure 8A:
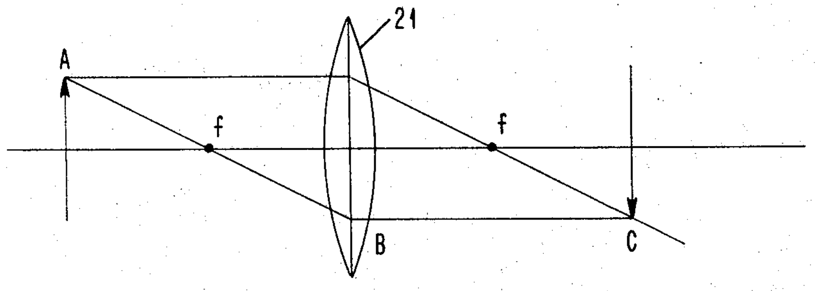
FIGS. 8*a* and 8*b* schematically show a comparison of the system operation with and without the object distance compensator of FIG. 4.
Figure 8B:
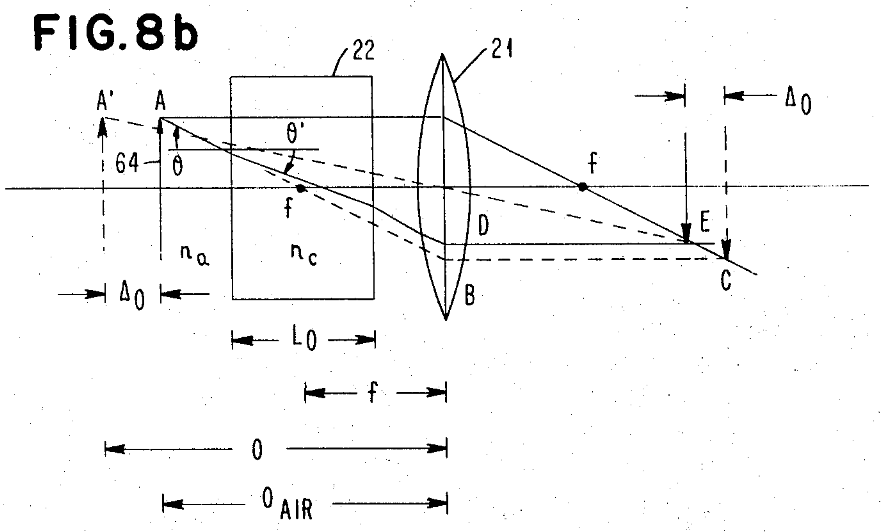

The effect of the birefringent crystals in the path between the lens and the object is illustrated by a comparison between FIGS. 8*a* and 8*b*. In FIG. 8*a* the uncompensated action of lens 21 is shown, whereas in FIG. 8*b* the object distance compensator is positioned between ray 64 and lens 21. Ray 64 which would normally follow path ABC is refracted by compensator 22 and follows path ADE. The amount of this object distance shift $\Delta_o$ depends on the thickness L*o* of the crystal of compensator 22 and the difference in indices of refraction between the crystal index $\eta_c$ and the surrounding medium index $n_a$. For angle $\theta$ less than 15° this shift is approximately $$\Delta_o = LO\,\frac{(n_c - n_a)}{n_c} \qquad (1)$$

The magnification of the object is $$M = \frac{f}{o - f}$$

Figure 9A:
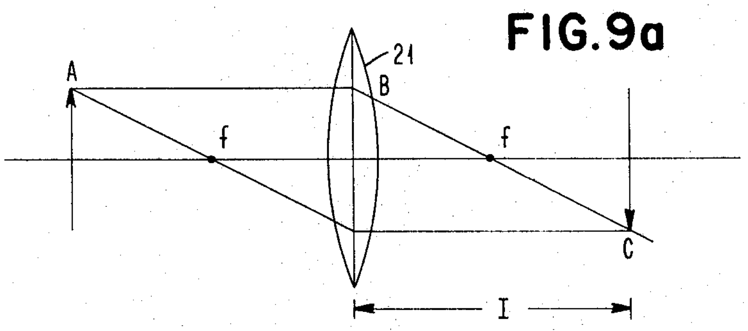
FIGS. 9*a* and 9*b* schematically show a comparison of the system operation with and without the image distance compensator of FIG. 4; and, FIGS. 10, 11 and 12 show alternative embodiments of compensation apparatus according to the invention.
Figure 9B:
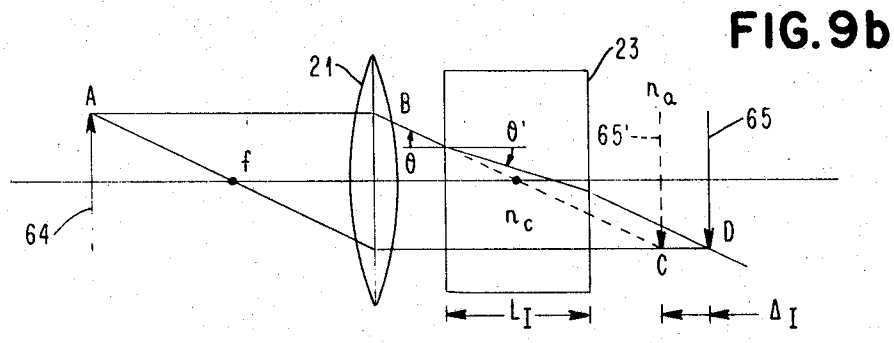

The result of introducing a birefringent crystal into the ray path on the image side of lens 21 is shown in FIGS. 9*a* and 9*b*. In FIG. 9*a* the uncompensated action of lens 21 is shown whereas in FIG. 9*b* compensator 23 is positioned between lens 21 and ray 65. Ray 64 which would normally follow path ABC is refracted by the crystal in compensator 23 to follow the path ABD to appear as ray 65. This causes the image to shift by $\Delta_I$ where $$\Delta_I = LI\,\frac{(n_c - n_a)}{n_c} \qquad (2)$$

and LI is the thickness of the crystal of compensator 23. It is observed that the image size has not changed when shifted from position 65' to 65.

From FIGS. 7 and 8*b* it is observed that the object distance compensator controls the magnification, and from FIG. 9*b* that image distance compensator controls the position of the image. For three different objects, each of a different color, the magnifications and image distances must be adjusted simultaneously to obtain all images superimposed at 24 on output medium 20 in FIG. 5.

The magnifications $M_R$, $M_G$, $M_B$ of the red, green and blue images, respectively, are:

$$M_R = \frac{f}{R_1 - f} \qquad (3)$$

$$M_G = \frac{f}{G_1 - f} \qquad (4)$$

$$M_B = \frac{f}{B_1 - f} \qquad (5)$$

when $f$ is the focal length of the lens.

The size of the objects 43, 44, 45 in FIG. 5 are known for a given system. If one magnification is known, then the other magnifications can be calculated so that all the images are the same size. If the magnification $M_R$ and the object size $O_R$ of object 45 are known, for example, then the red image size is:

$$I_R = M_R O_R$$

As shown in FIG. 7, $I_R = I_G = I_B$ (image distance compensator not introduced yet) or $$M_G O_G = I_G = I_R = M_R O_R$$

$$M_B O_B = I_B = I_R = M_R O_R$$

where $O_B$ and $O_G$ are the object sizes of objects 43, 44. Therefore $$M_G = M_R\,\frac{O_R}{O_G} \qquad (6)$$

$$M_B = M_R\,\frac{O_R}{O_G} \qquad (7)$$

From Equations 3, 4 and 5 it is determined that:

$$R_1 = \frac{(1 + M_R)}{M_R} f \qquad (8)$$

$$G_1 = \frac{(1 + M_G)}{M_G} f \qquad (9)$$

$$B_1 = \frac{(1 + M_B)}{M_B} \qquad (10)$$

As shown in FIG. 7, therefore:

$$\Delta_{BG} = B_1 - G_1$$

Crystal 31 in FIG. 5 is employed to obtain the relative separation $\Delta_{BG}$ between the blue and green object planes. When this crystal is employed $\Delta S2$ doesn't change since the green and red wavelengths see the same index of refraction $n_{eo}$ in crystal 31.

To determine the value of $\Delta_{BG}$, Equation 1 is applied to the crystals used in the apparatus of FIG. 5.

$$\Delta_{BG} = L_1\,\frac{(\eta_o - 1)}{n_o} - L_1\,\frac{(\eta_{eo} - 1)}{n_{eo}} + \Delta S1$$

$$\Delta_{BG} = L_1\,\frac{(\eta_o - \eta_{eo})}{\eta_o \eta_{eo}} - \Delta S1$$

$$L_1 = (\Delta_{BG} - \Delta S1)\left(\frac{\eta_o \eta_{eo}}{\eta_o - \eta_{eo}}\right) \qquad (11)$$

Similarly, as shown in FIG. 7, therefore:

$$\Delta_{GR} = G_1 - R_1$$

Crystal 32 is employed in FIG. 5 to obtain the relative separation $\Delta_{GR}$ between the green and red object planes. When this crystal is employed $\Delta_{GR}$ doesn't change since the blue and green wavelengths see the same index of refraction $\eta_o$ in crystal 32. $\Delta_{GR}$ is determined in the same manner as $\Delta_{BG}$.

$$\Delta_{GR}=L_2\frac{(\eta_o-1)}{\eta_o}-L_2\frac{(\eta_{eo}-1)}{\eta_{eo}}+\Delta S2$$

$$\Delta_{GR}=L_2\frac{(\eta_o-\eta_{eo})}{\eta_o\eta_{eo}}+\Delta S2$$

$$L_2=(\Delta_{GR}-\Delta S2)\left(\frac{\eta_o\eta_{eo}}{\eta_o-\eta_{eo}}\right)\quad(12)$$

To illustrate how these formulae are employed, the following example is considered where the object sizes 43, 44, 45 are respectively, $$O_R=1'',\ O_G=1.05'',\ O_B=1.1''$$

$$\Delta S1=\Delta S2=0.1''$$

when $M_R=1$ and $f=3''$ then:

$$M_G=M_R\frac{O_R}{O_G}=\frac{1}{1.05}=.95$$

(from eq. 6)

$$M_B=M_R\frac{O_R}{O_B}=\frac{1}{1.1}=.91$$

(from eq. 7)

$$R_1=\frac{(1+M_R)}{M_R}f=\left(\frac{1+1}{1}\right)3=6.0''$$

(from eq. 8)

$$G_1=\frac{(1+M_G)}{M_G}f=\frac{(1.95)}{.95}3=6.18''$$

(from eq. 9)

$$B_1=\frac{(1+M_B)}{M_B}f=\left(\frac{1.91}{.91}\right)3=6.3''$$

(from eq. 10)

$$\Delta_{BG}=B_1-G_1=0.12''$$

$$\Delta_{GR}=G_1-R_1=0.18''$$

$$L_1=(\Delta_{BG}-\Delta S1)\frac{\eta_o\eta_{eo}}{\eta_o-\eta_{eo}}$$

For calcite crystals the indices of refraction are:

$$\eta_o\approx 1.65$$

$$\eta_{eo}\approx 1.47$$

$$L_1=(0.12-0.1)13.5=.27''$$

$$L_2=(\Delta_{GR}-\Delta S2)13.5$$

$$L_2=(0.18-0.1)13.5=1.08''$$

The actual distances from lens 21 are shown in FIG. 7 as $R_{1\,air}$, $G_{2\,air}$, $B_{2\,air}$. Using Equation 1 to calculate $\Delta_{OR}$, $\Delta_{OG}$, $\Delta_{OB}$, then $$R_{1\,air}=R_1-\Delta_{OR}=R_1-(t_1+t_2)\frac{(\eta_q-1)}{\eta_q}-(L_1+L_2)\frac{(\eta_{eo}-1)}{\eta_{eo}}$$

$$G_{1\,air}=G_1-\Delta_{OG}=G_1-(t_1+t_2)\frac{(\eta_q-1)}{\eta_q}-L_1\frac{(\eta_{eo}-1)}{\eta_{eo}}-L_2\frac{(\eta_o-1)}{\eta_o}$$

$$B_{1\,air}=B_1-\Delta_{OB}=B_1-(t_1+t_2)\frac{(\eta_q-1)}{\eta_q}-(L_1+L_2)\frac{(\eta_o-1)}{\eta_o}$$

where $\eta_q$ is the index of refraction for quartz.

From FIG. 9*b* it is observed that the introduction of compensator 23 including the birefringent crystals on the image side of the lens shifts the position of the image away from the lens by an amount $$\Delta_I=L_I\frac{(\eta_c-\eta_a)}{\eta_c}$$

where $\eta_c$ is the index of refraction of the crystal, and $\eta_a$ is the index of refraction of the surrounding medium. It is noted that the image size does not change.

Using the lens formula:

$$\frac{1}{f}=\frac{1}{R_1}+\frac{1}{R_{2\,air}}$$

$$R_{2\,air}=\frac{R_1f}{R_1-f}\quad(13)$$

Similarly:

$$G_{2\,air}=\frac{G_1f}{G_1-f}\quad(14)$$

and $$B_{2\,air}=\frac{B_2f}{B_1-f}\quad(15)$$

The values of $\Delta_{I\,BG}$ and $\Delta_{I\,GR}$ as shown in FIG. 7 are determined as follows:

$$\Delta_{I\,BG}=G_{2\,air}-B_{2\,air};\ \Delta_{I\,GR}=R_{2\,air}-G_{2\,air}$$

where $R_{2\,air}$, $G_{2\,air}$, and $B_{2\,air}$ are the distances from the respective image planes to lens 21 in air where the red, green and blue images would be in the absence of the crystals in image distance compensator 23. When the image compensator is inserted in the system all the images are superimposed in plane 56 at a distance I from lens 21.

In FIGS. 5 and 7, crystal 40 shifts the blue and green image plane a relative distance $\Delta_{I\,GR}$ so that the green and red images are superimposed. Distance $\Delta_{I\,BG}$ doesn't change since the green and blue wavelengths see the same index of refraction $\eta_o$.

Crystal 42 shifts the blue relative to the green-red image plane by an amount $\Delta_{I\,BG}$ so that the blue plane is now superimposed on the red and green image plane a distance I from the lens..

These values of $\Delta_{I\,GR}$ and $\Delta_{I\,BG}$ and the value of I, the distance from lens 21 to plane 66, are determined as follows:

$$\Delta_{I\,GR}=R_{2\,air}-G_{2\,air}+L_3\left(\frac{\eta_o\eta_{eo}}{\eta_o-\eta_{eo}}\right)$$

$$\Delta_{I\,BG}=G_{2\,air}-B_{2\,air}=L_4\left(\frac{\eta_o\eta_{eo}}{\eta_o-\eta_{eo}}\right)$$

$$I=R_{2\,air}+(L_3+L_4)\left(\frac{\eta_{eo}-1}{\eta_{eo}}\right)+t_3\left(\frac{\eta_q-1}{\eta_q}\right)\quad(16)$$

Figure 10:
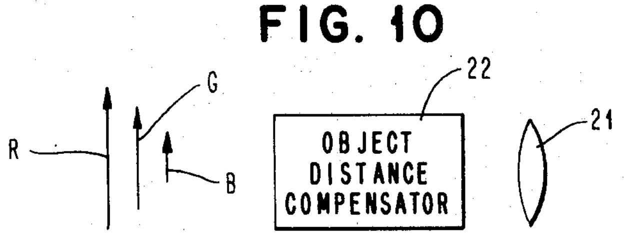
Figure 11:
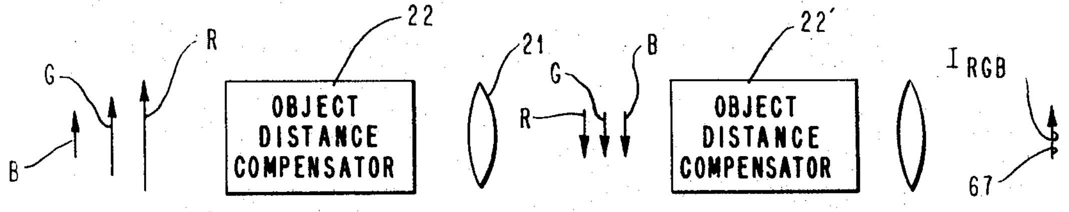
Figure 12:
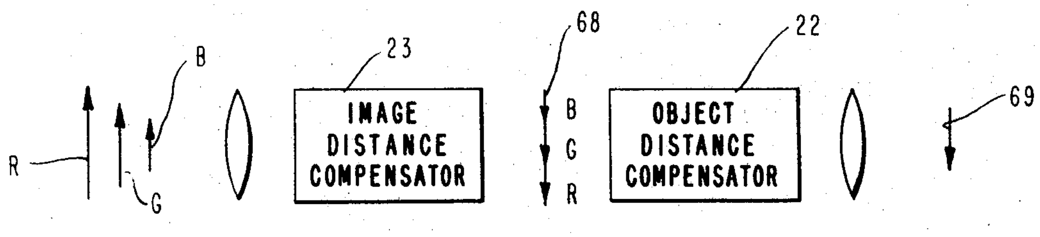

It is possible that the sequence of colors and sizes may be different as shown in FIG. 10 from those described in relation to FIGS. 1, 2, 3. When this occurs, several stages of image and object distance compensators may be required. In FIG. 10 the order of the red, green and blue planes has been interchanged. In FIG. 11 the order of the object size as compared to that of FIG. 5 has been changed. Superposition of the images IRGB at 67 is accomplished in two stages using object distance compensators 22 and 22'. In FIG. 12 the images have been superimposed at 68. In object distance compensator 22, correction for size is accomplished to get superposition in plane 69.

Many other arrangements are possible to accomplish the superposition of a plurality of images in different wavelengths. In each the same idea is employed, that is, the planes of polarization of selected colors are rotated and the distances are slectively changed. In similar manner, it is apparent that these systems work in reverse. In FIG. 5, the three color images at 24 can be decomposed into the three images at 43, 44 and 45.

It is further apparent that any number of colors may be accommodated by the apparatus of this invention merely by increasing the number of stages employed in both the object distance compensator 22 and the image distance compensator 23. Each of these stages except the first stage of the image distance compensator employs a polarization rotation element and a birefringent device. The first stage of the image distance compensator employs only the birefringent device as it is not necessary to rotate the polarization direction of any of the components of the light beam. The lengths of the polarization rotation elements are selected so as to act on particular wavelengths of light. The lengths of the birefringent device are selected so as to provide an increased optical path distance to certain of the wavelengths. With the object images provided in the same focal plane at lens 21 and with the respective optical path distances from the planes 14, 15, 16 to lens 21, and from lens 21 to the plane of medium 20 being such as to satisfy the above equations, all of the images are provided with a magnification eliminating transverse dispersion found in prior art devices.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. Dispersion compensating apparatus for acting on object images formed in a plural wavelength light beam in individual planes at the input to said apparatus to provide all of them in a common plane with the same size, comprising:

means located between the input to said apparatus and said common plane for focusing said object images in said common plane with the same size, said means having an effective focal length dependent on the relationship between the optical path distances traversed by said object images from said input to said means and from said means to said common plane, and first and second dispersion compensating means disposed respectively between said input and said focusing means and said focusing means and said common plane for altering the optical path distances traversed by predetermined ones of the wavelengths causing all of the object images to traverse differing distances, said first compensating means providing all of said object images with the same size and said second compensating means providing all of said object images in the same focal plane at said common plane.

2. The apparatus of claim 1, wherein each of said compensating means comprises means for rotating the polarization of selected ones of the wavelengths and means presenting different optical path distances to the wavelengths dependent on the polarization so that the object images are the same size.

3. The apparatus of claim 1, wherein each of said compensating means is formed of a plurality of stages, each stage comprising birefringent means for presenting two possible optical path distances to the wavelengths dependent on the polarization of light, and means preceding each of said birefringent means except the one immediately following the focusing means for rotating the polarization of selected ones of the wavelengths.

4. Dispersion compensation apparatus for acting on object images formed in a plural wavelength light beam in individual planes with a common polarization direction at the input to said apparatus to provide all of them in a common plane, comprising:

a plurality of dispersion compensation stages equal in number to one less than the number of wavelengths in the beam and arranged in cascade to receive the object images, each of said stages having in the order of the incoming beam of light, means for rotating the polarization direction of a predetermined wavelength of the beam by a fixed amount, and birefringement means presenting two different optical path distances to the wavelengths of the beam dependent on the polarization directions of the wavelengths.

5. Dispersion compensation apparatus for acting on object images formed at the input to said apparatus in a plural wavelength light beam in a common plane with at least one wavelength of the beam having a polarization direction differing from the polarization directions of the other wavelengths by a fixed amount to provide all of them in a common plane, comprising:

a plurality of dispersion compensation stages equal in number to one less than the number of wavelengths in the beam and arranged in cascade to receive the object images, each of said stages except the first having in the order of the incoming beam of light, means for rotating the polarization direction of a predetermined wavelength of the beam by a fixed amount, and birefringent means presenting two different optical path distances to the wavelengths of the beam dependent on the polarization directions of the wavelengths, the first of said stages including only the birefringent means for presenting two different optical path distances to the incoming beam of light.

6. Apparatus for compensating for transverse and longitudinal dispersion in the object images formed in a plural wavelength light beam projected from a light beam deflection system toward an output medium, comprising means located between the output of said system and said medium for focusing said object images with the same size, said means having a relative focal length dependent on the relationship between the optical path distances traversed by said object images from the output of said system to said means and from said means to said medium, and first and second dispersion compensating means disposed respectively between the output of said system and said focusing means and said focusing means and said medium, each of said compensating means having polarization control means for acting on predetermined ones of the wavelengths causing all of the object images to traverse differing optical path distances, so that said first compensating means acts to provide all of said object images in the same focal plane at the focusing means and said compensating means acts to provide all of said object images in the same focal plane at said medium.

7. The apparatus of claim 6, wherein each of said compensating means is formed of a plurality of stages equal to one less than the number of wavelengths, each stage comprising birefringent means for presenting two possible optical path distances to the wavelengths dependent on the polarization of light, and means preceding each of said birefringent means except the one immediately following the focusing means for rotating the polarization of selected ones of the wavelengths.

8. A dispersion compensated optical display system in which a plural wavelength light beam is focused through a light deflecting refraction means onto an output medium, comprising:

means in the path of the light beam for focusing said light onto said medium, and a plurality of dispersion compensating stages equal in number to 2(*n*—1) where *n* is the number of wavelengths in the beam, the stages being positioned in cascade in the path of the light beam so that one half are located between said refraction means and said focusing means and the other half are located between said focusing means and said medium, each of said stages except the stage immediately following the focusing means comprising in the order named, means for rotating the polarization direction of a predetermined one of the wavelengths of said beam by a fixed amount and means providing two different optical path distances to the wavelengths dependent on the polarization direction of the wavelengths, the stage immediately following the focusing means comprising only means for providing two different optical path distances to the wavelengths dependent on polarization direction.

9. In a projection system in which object images are formed in a plural wavelength light beam in individual planes for simultaneous superimposed projection on a common plane with the same size by focusing means having an effective focal length dependent on the distances traversed from the individual planes to the common plane, the improvement comprising, means located between said individual planes and said common plane for compensating for aberration differences in the formed object images by altering the effective location of the individual planes with respect to the focusing means, said compensating means introducing fixed polarization alterations and different optical path distances in predetermined ones of the wavelengths dependent on the polarization alteration thereby causing all of the object images to traverse differing distances so that said focusing means projects all of said object images on the common plane without aberration differences.

References Cited

UNITED STATES PATENTS

| | | |
|---|---|---|
| 3,183,763 | 5/1965 | Koester. |
| 3,497,284 | 2/1970 | Kosanke et al. |

DAVID SCHONBERG, Primary Examiner

P. R. MILLER, Assistant Examiner

U.S. Cl. X.R.

350—150, 168